（12）United States Patent
Gall (10) Patent No.: US 10,873,663 B1
(45) Date of Patent: *Dec. 22, 2020

(54) MULTI-CALL MANAGEMENT SYSTEM AND METHOD

(71) Applicant: Erik Gall, Grants Pass, OR (US)

(72) Inventor: Erik Gall, Grants Pass, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,041

(22) Filed: Jul. 5, 2019

Related U.S. Application Data (63) Continuation of application No. 16/100,577, filed on Aug. 10, 2018, now Pat. No. 10,375,239.

(51) Int. Cl.
*H04M 3/51* (2006.01)
*H04M 3/523* (2006.01)

(52) U.S. Cl.
CPC ....... *H04M 3/5158* (2013.01); *H04M 3/5175* (2013.01); *H04M 3/5183* (2013.01); *H04M 3/523* (2013.01)

(58) Field of Classification Search
CPC ...... H04M 3/51; H04M 3/5183; H04M 3/523; H04M 3/5233; H04M 2203/402
USPC ............ 379/265.02, 265.05, 265.11, 265.12, 379/265.06, 265.07, 265.01, 265.14
See application file for complete search history.

(56) References Cited

U.S. PATENT DOCUMENTS

| | | | |
|---|---|---|---|
| 2006/0154654 A1* | 7/2006 | Jabbour | H04M 3/428 |
| | | | 455/417 |
| 2013/0003943 A1* | 1/2013 | Munns | H04M 3/5175 |
| | | | 379/88.01 |
| 2020/0007477 A1* | 1/2020 | Nair | G06F 40/30 |

* cited by examiner

*Primary Examiner* — Thjuan K Addy (57) ABSTRACT

A multi-call management system for allowing a user to toggle between a first call and a second call, allowing the user to send and receive messages between the first and second callers.

12 Claims, 8 Drawing Sheets

MULTI-CALL MANAGEMENT SYSTEM AND METHOD

BACKGROUND

1. Field of the Invention

The present invention relates generally to outbound calling systems, and more specifically, to systems for improving the efficiency and productivity of those persons tasked with completing the calls.

2. Description of Related Art

Figure 1:
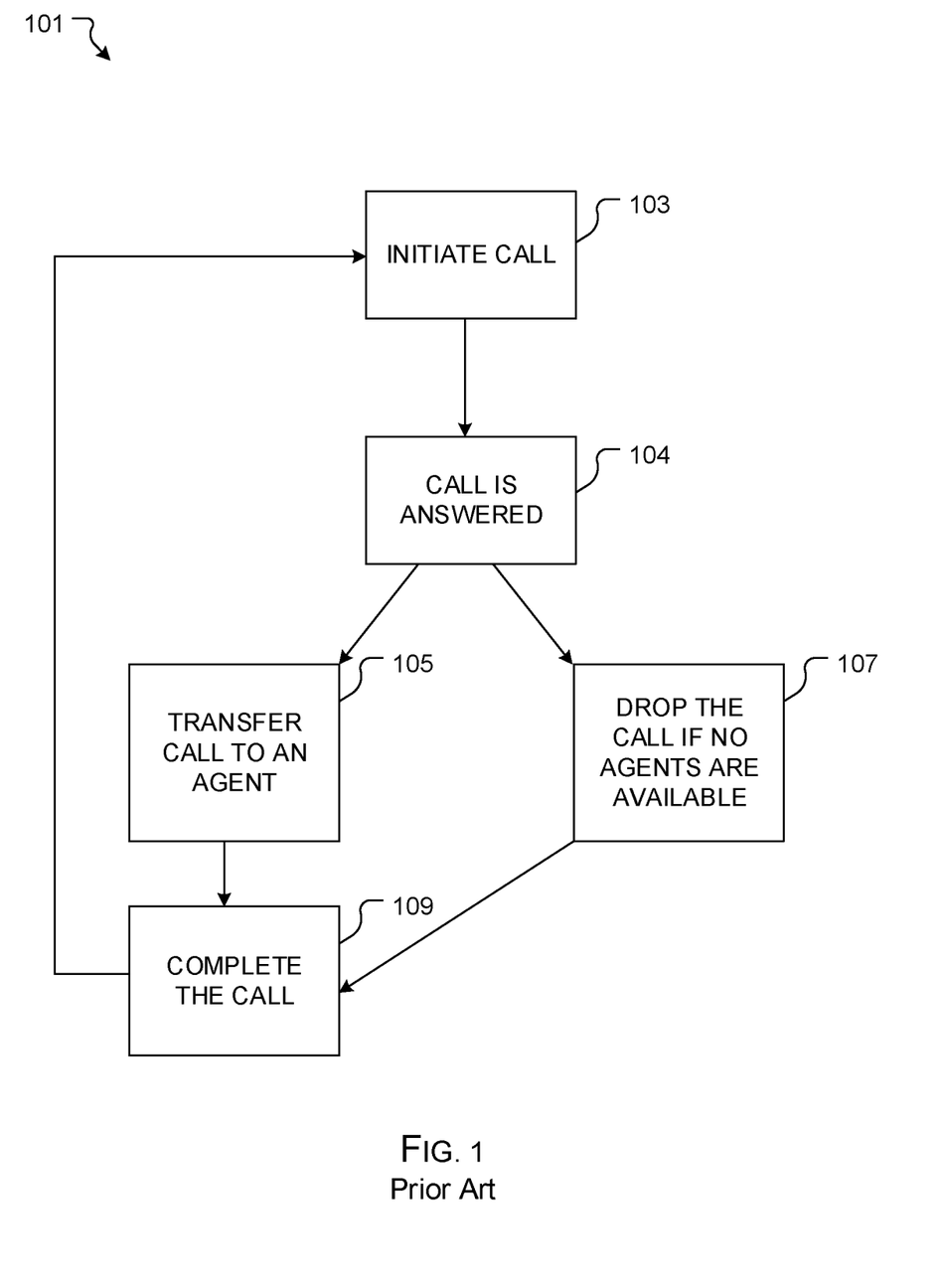
FIG. 1 is a diagram of a common outbound calling system.

Outbound calling systems are well known in the art and are effective means to contact potential clients or others with whom a conversation is desired. For example, FIG. 1 depicts a conventional outbound calling system 101 having a dialer that initiates calls 103 and when a call is answered 104, the dialer transfers the call to an agent 105, if no agents are available the dialer drops the call 107. When an agent completes a call 109 agents are sent back to await a new call from the dialer.

One of the problems commonly associated with system 101 is limited use. For example, regulations and best practices direct that a call must be originated by an agent or other living person.

Accordingly, although great strides have been made in the area of out bound calling systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 8 is a flowchart of the method of the call management system of.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional outbound calling systems. Specifically, the invention of the present application enables agent initiated outbound calls. In addition, the invention manages the efficiency of the agents and maximizes their efforts. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
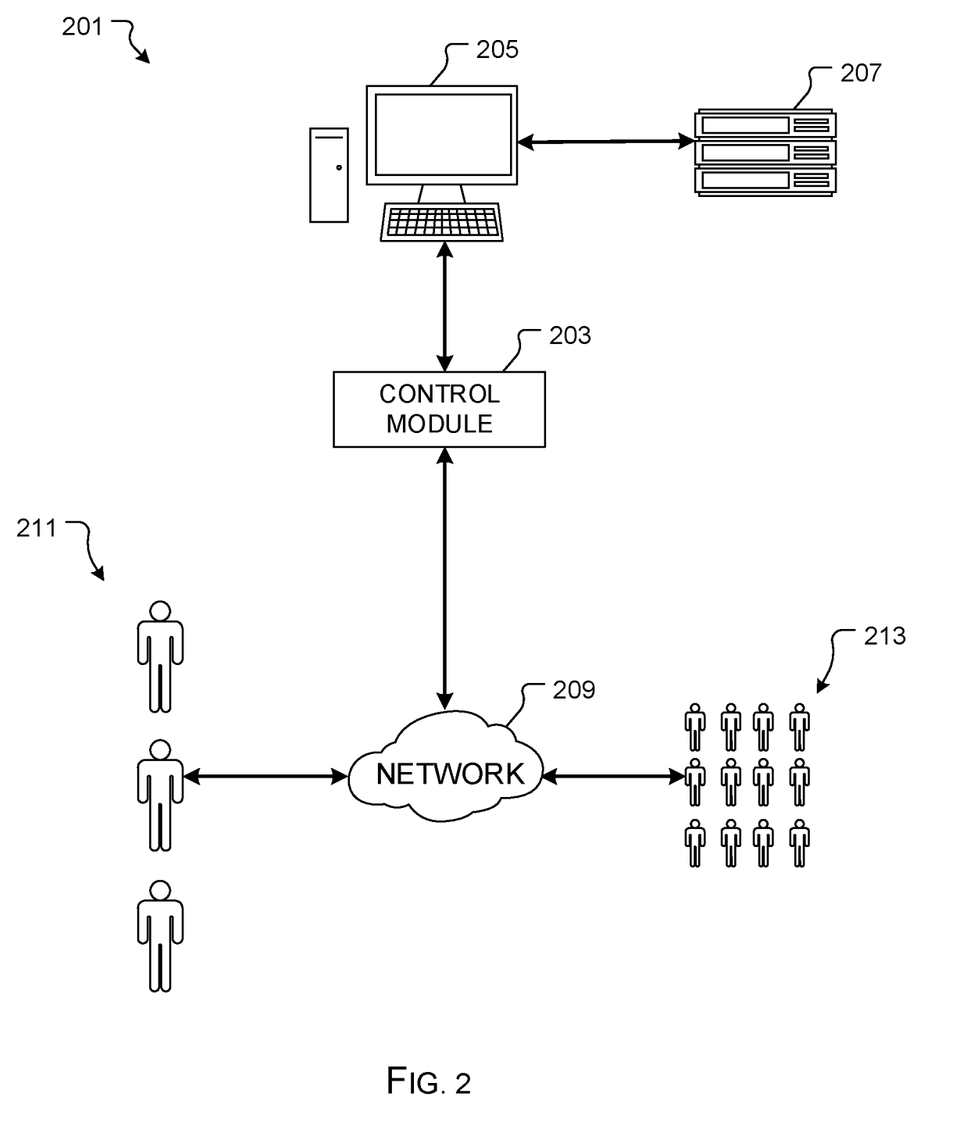
FIG. 2 is a diagram of an agent directed dialing system in accordance with a preferred embodiment of the present application.

Referring now to the drawings wherein like reference characters identify corresponding or similar elements throughout the several views, FIG. 2 depicts a diagram of an agent directed dialing system in accordance with a preferred embodiment of the present application. It will be appreciated that system 201 overcomes one or more of the above-listed problems commonly associated with conventional outbound calling systems.

In the contemplated embodiment, system 201 includes a control module 203 running on a CPU 205 having a database 207. The control module 203 in communication with agents 211 and people 213 via a network 209. It is contemplated that any user, person or the like interacting with the control module 203 is considered an agent 211 for this disclosure e.g. a supervisor or administrator.

Figure 3:
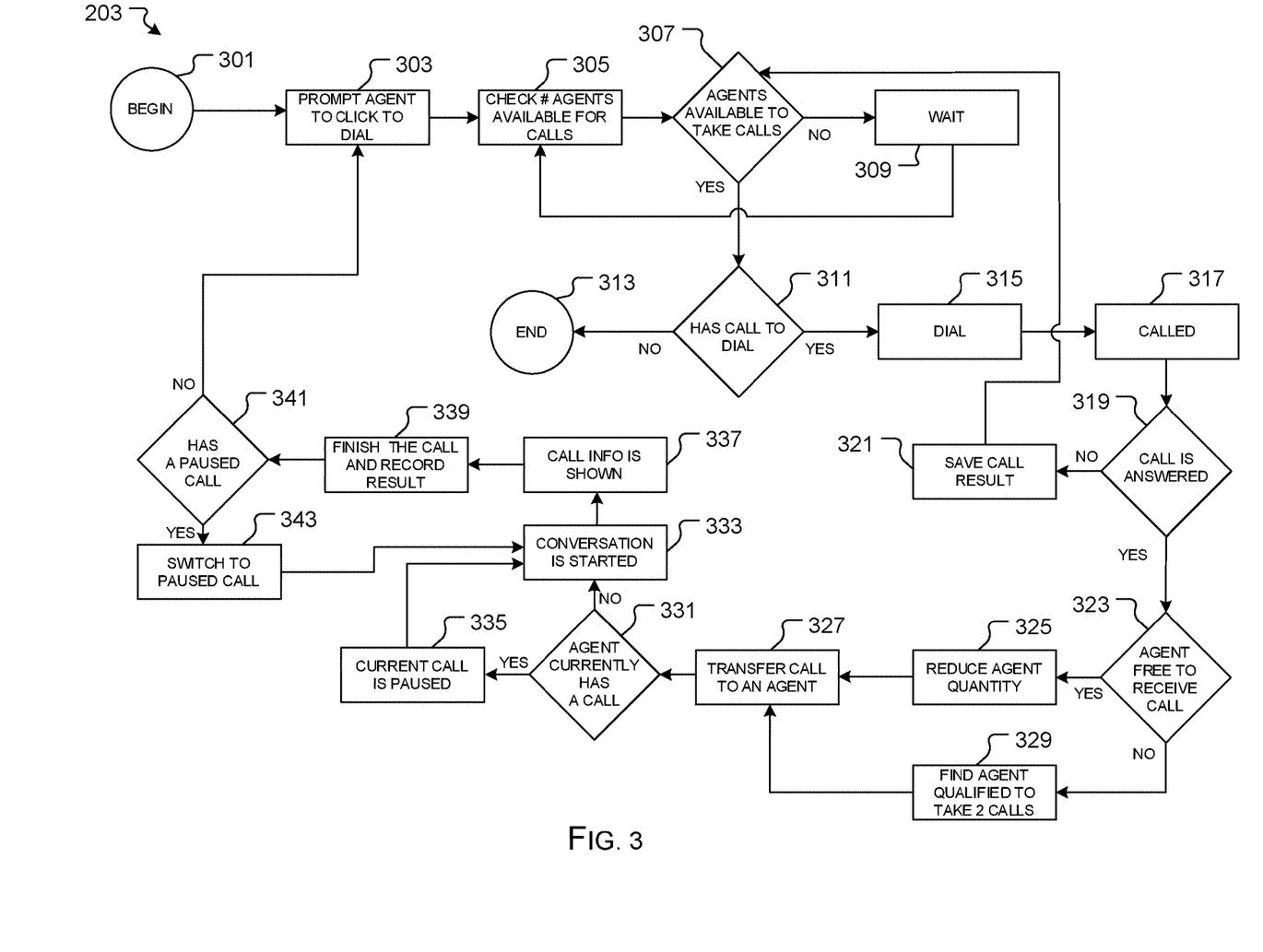
FIG. 3 is a flowchart of the preferred configuration of the control module of FIG. 2.

The control module 203 enabling the agents to convey information or inquiries to the people 213 as depicted by FIG. 3. Control module 203 including prompting an agent who becomes active in the module 203 to click a button or the like to initiate a call 303. It is contemplated that while the agent initiates a call 303 that the module could select the intended recipient or other aspects of the call but that the module 203 is acting as directed by the agent when the call was initiated.

When the module 203 establishes that agents are available and that calls are initiated the call is allowed to be placed and a response awaited (see 305, 307, 311, 315, 317 and 319). It is contemplated that if agents are in the module 203 but occupied therein, the system 201 will wait 309 until at least one agent is available before allowing calls to be made. It is further contemplated that if for any reason no agents are available and the module 203 of the system 201 is active that it will shut down 313. If a call ends and no answer is obtained it is recorded 321 and the line becomes available for another call.

When a call is answered the module determines which agent should take the call, and if all agents are on a call then the new answered call is routed to an agent qualified to handle multiple calls (see 323, 325, 327, 329, 331, 333 and 335). When a call with a person is connected to an agent the module 203 displays the information about the call 337 to the agent, this could include prompts, personal information or the like. When a call is completed, and the results are recorded 339 if the agent has another call on hold 341 they are returned thereto 343 or the module prompts the agent to click to dial a new call 303.

It is contemplated and will be appreciated that the module 203 could utilize additional methods or algorithms could be used such as to determine how many calls are initiated by each click an agent makes or how many calls to concurrently allow.

It should be appreciated that one of the unique features believed characteristic of the present application is that an agent 311 initiates calls.

Figure 4:
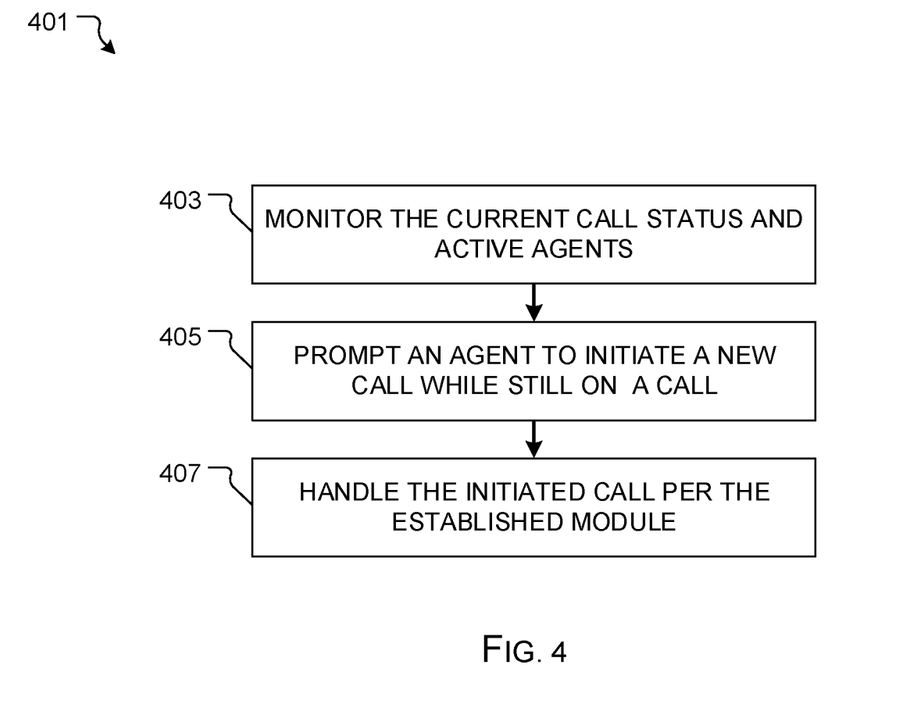
FIG. 4 is a flow chart of an alternative feature for a control module.

In an alternative embodiment 401 the control module 203 includes the ability to monitor the status of the agents in calls 403 and determine the probability of needing to add an additional call or calls and prompting an agent to initiate the additional calls 405. These new additional calls are handled 407 according to the control module 203 wherein this embodiment functions.

It will be understood that capabilities common in the art such as automatic dialing could be implemented in any of the embodiments without deviating from the intent thereof.

Figure 5:
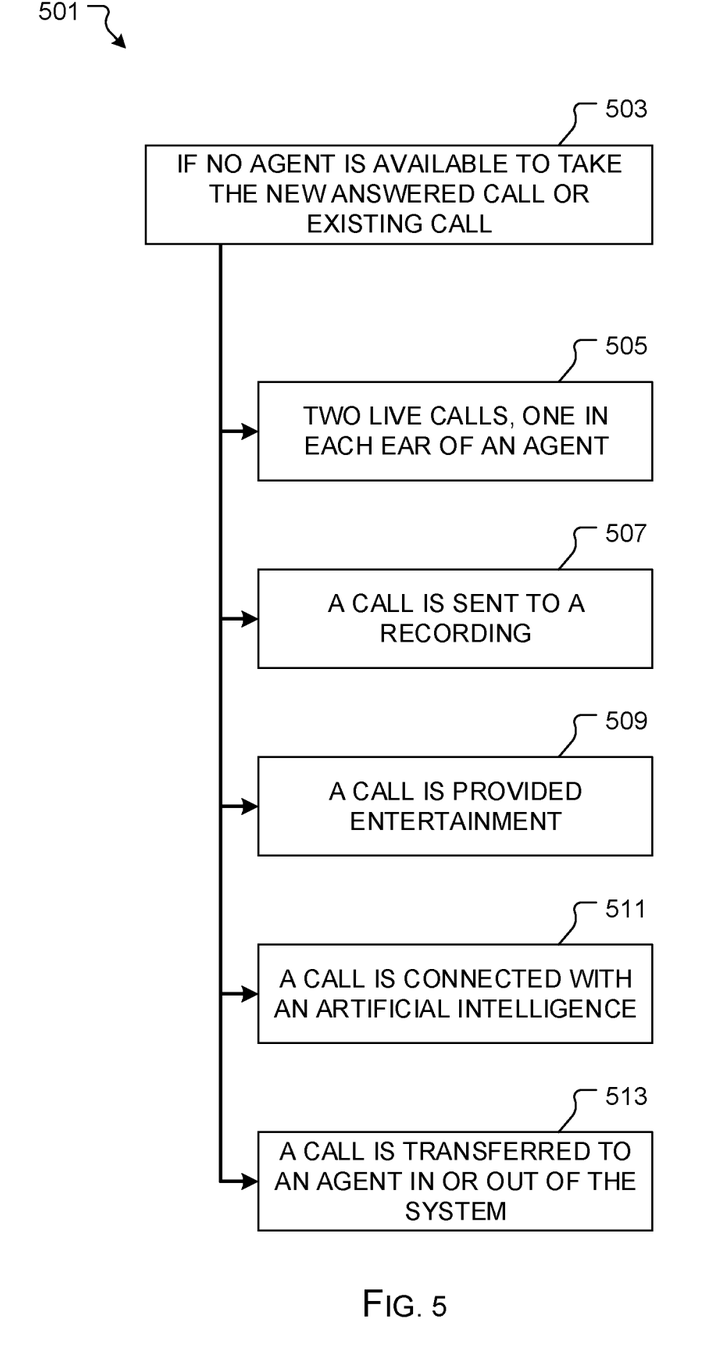
FIG. 5 is a flow chart of a method associated with the present invention.

It is contemplated and is depicted by FIG. 5 that should no agent be free to handle a call that is answered 503 other options exist than those depicted by FIG. 3. Alternative embodiments 501 of these options include enabling an agent to handle two simultaneous calls where one call is placed in a first ear phone and another call is placed in a second ear phone 505. It will be appreciated that the agent could switch their communication between calls.

Additional embodiments 501 include connecting the answered call or an existing call with a pre-recorded message 507 or provided a form of entertainment 509 such as music, a game or the like. Another embodiment 501 includes connecting either the new or existing call with an artificial intelligence 511 that could communicate a message, require input and take action based on the input received. Another embodiment 501 for handling a call with no available agents is that either the new call or an existing call could be transferred to another agent inside of the system or outside thereof 513. While these embodiments 501 are provided they are not intended as exhaustive or limiting in the action the module can take when a call is answered.

Figure 6:
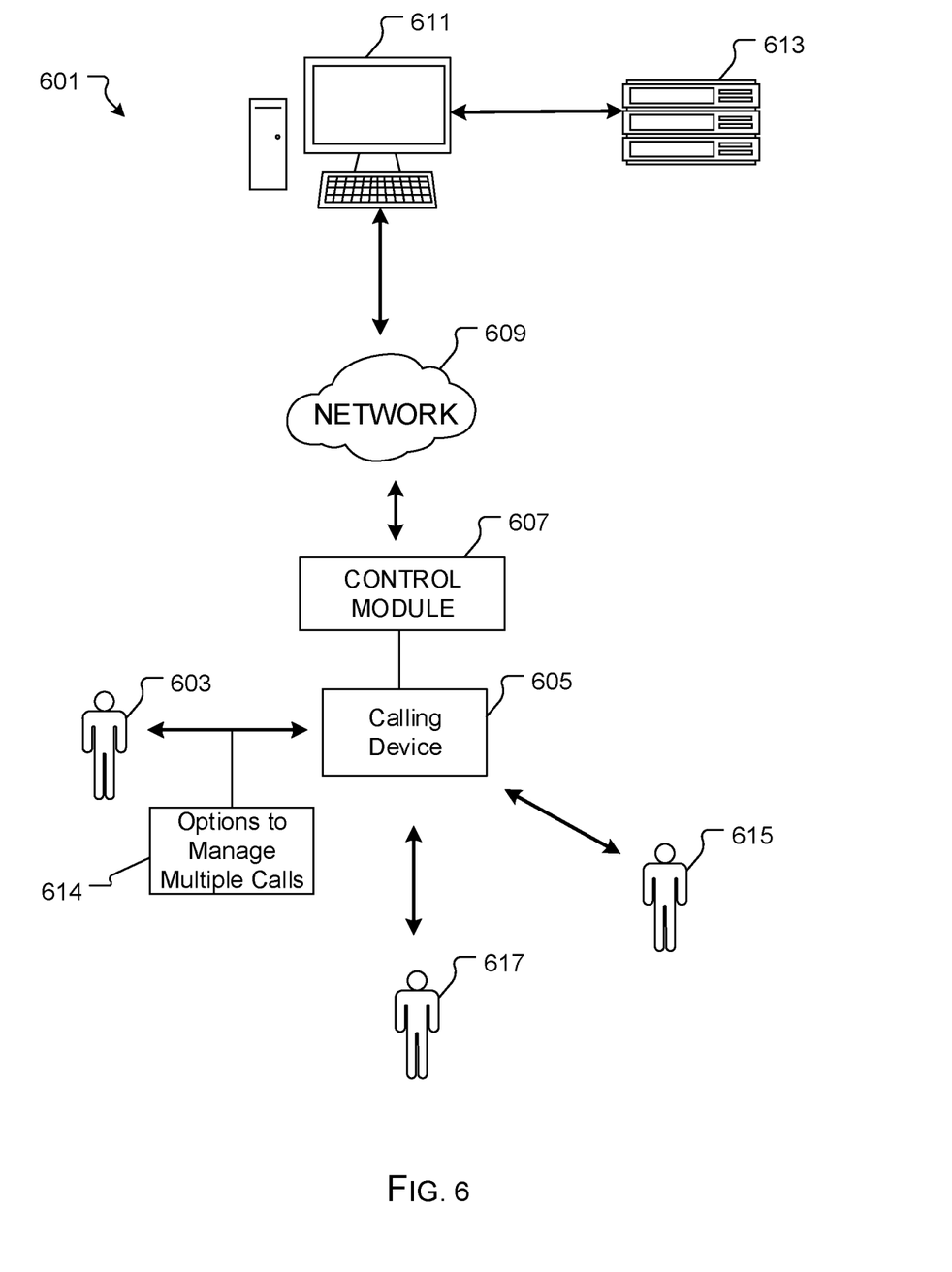
FIG. 6 is an embodiment of a call management system in accordance with an alternative embodiment of the present application.
Figure 7:
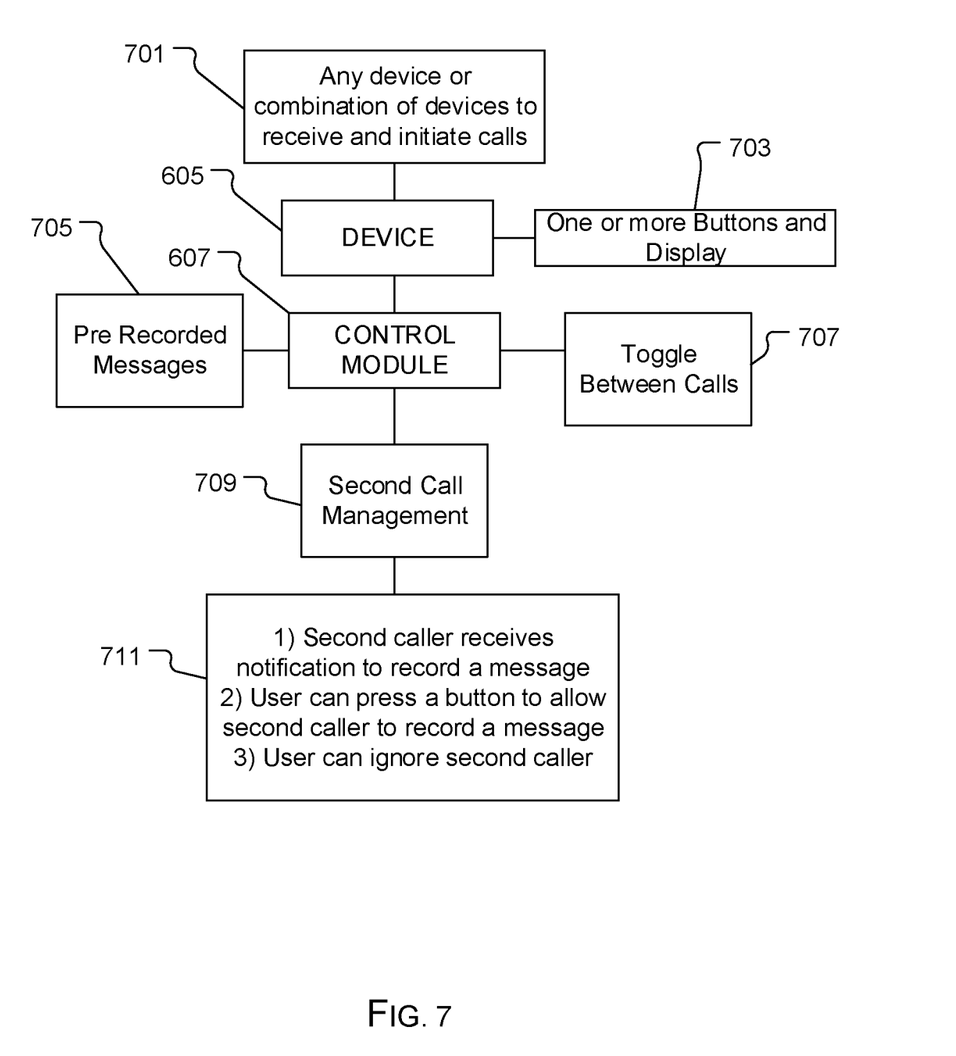
FIG. 7 is a flowchart of the steps associated with the control module of FIG. 6.
Figure 8:
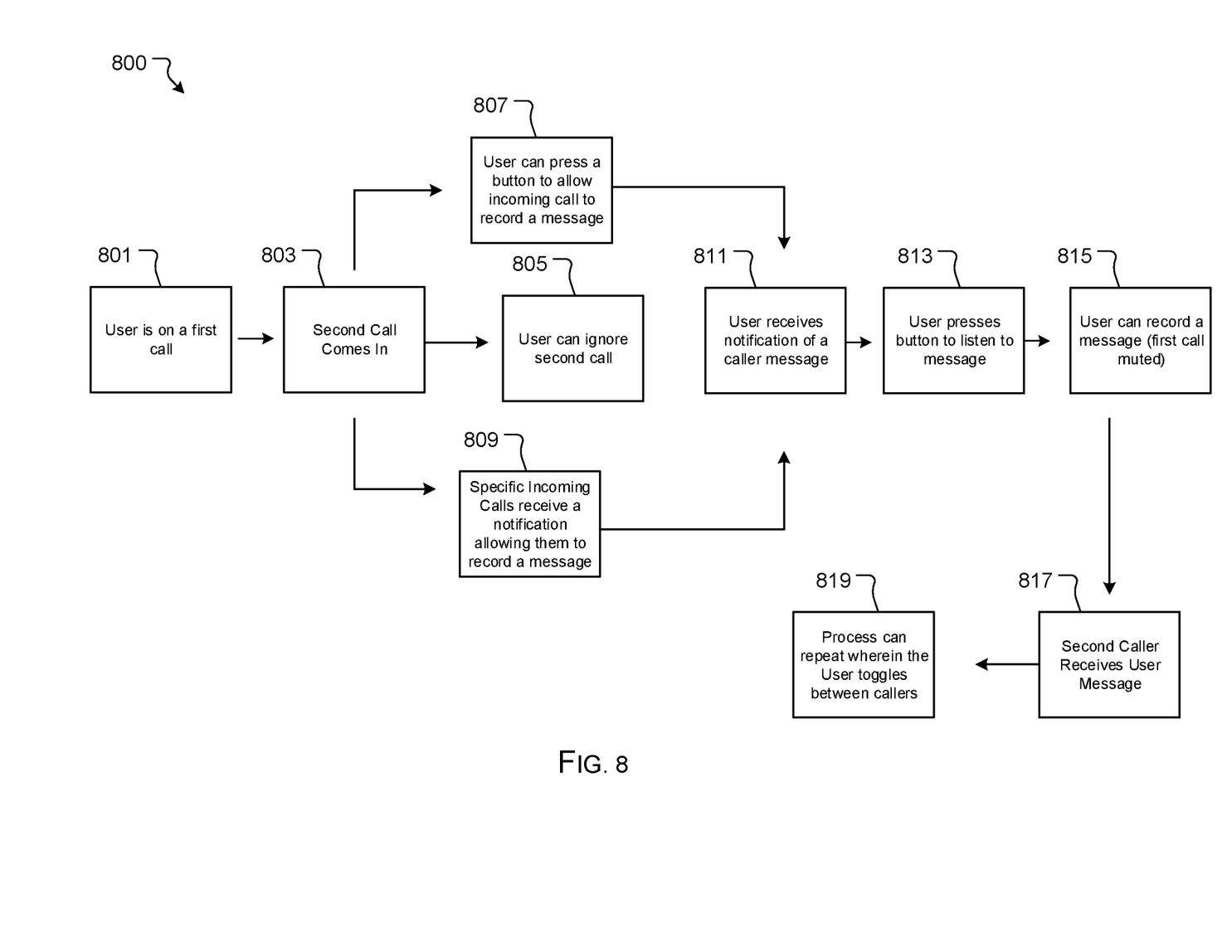

In FIGS. 6-8, an alternative embodiment of a call management system is shown. In FIG. 6, a simplified schematic depicts a call management system 601 having a user 603 using a calling device 605 in communication with a control module 607, a network 609, a CPU 611, and a database 613. In this embodiment, the system 601 is configured to provide a convenient means for the user 603 to manage 614 a plurality of incoming and/or outgoing calls with a plurality of callers 615,617. It should be appreciated that this system is suitable for use with any calling environment, such as call centers, businesses, homes, cell phones, and any other application in which it may be desirable to manage multiple calls at once.

In FIG. 7, a schematic depicts a simplified explanation of the functionality of the control module 607 in combination with the device 605. Again, it should be appreciated and understood that the device 605 can be any single or combination of devices 701 that can be used for calling. The device 605 can include a display and one or more buttons 703 for operation, and further, it is contemplated that in some embodiments, the one or more buttons 703 are not directly associated with the device, but instead are either associated with another device or are stand alone features. The control module 607 can receive and store one or more pre-recorded messages 705 from the user, wherein the pre-recorded messages 705 can be relayed to one or more callers. The control module 607 allows for a user to toggle 707 between calls as needed and provides for a second call management 709 procedure, as will be discussed in detail. The second call management procedure 709 allows for the user to select one or more options 711, including allowing the user to set a default option to allow specific incoming calls to automatically receive a notification allowing them to record a message, or allowing the user to press a button to allowing an incoming caller to record a message, or allowing the user to ignore the incoming call altogether. This will be discussed in more detail.

It should be appreciated that this system of multi-call management is believed novel and allows for anyone to manage incoming calls effectively.

In FIG. 8, a flowchart 800 further depicts the features and methodology for managing multiple calls at once. As shown, it should be appreciated that the user will be on a first call 801 and receive a second call 803. The user will have options through the control module to manage the second call. As shown, one option is for the user to just ignore the second call 805. This option will send the second caller to voicemail or the like, as is the normal and conventional procedure. The user can designate with the control module that specific incoming calls receive a notification allowing them to record a message 809. For example, the user can use the calling device and the control module to establish that some contacts, such as family, will automatically receive a notification to allow them to record a message for the user. The other option is for the user to be provided with an option to press a button to prompt the second caller to record a message 807.

As shown, regardless of how the second caller gets there, if the second caller records a caller message, the user will receive a notification of the message 811. The user can then proceed to press a button to listen to the message 813. Note that the user is still on the line with the first call, therefore the message may play over the first caller, or the first caller may be muted while the message plays. The user can then be prompted to record their own message 815. In some embodiments, the user will be prompted to press another button (which can be the same as the first or separate) to record their own message. The user will record their message while the first call is muted or placed on hold briefly. The user message will then be sent to the second caller 817. It should be appreciated that this process can repeat as desired. Further, it should be appreciated that this system can be expanded to more than two callers.

The system and method of the present invention allows for improved call management, wherein a user can determine which caller(s) they want to speak to and when, as well as which caller(s) can hear then at a time. The control module can use predetermined rules or an interaction with the user to mute or pause calls. The system allows for any of the parties to record messages to be played during the live call. It should be appreciated that messages can not only be voice messages, but also text messages, videos, or any other means.

In some embodiments, the device can include a display, which further facilitates the exchange of information to the user. It should be appreciated that the device may have a display incorporated therein, or alternatively, there can be second devices (such as computer screens or wearable technology) to display information such as the incoming caller.

It should be appreciated that the system of the present invention is suitable for call centers, wherein agents can take multiple calls and manage multiple calls in the manner described above. The system can be adapted for use with incoming and out bounding calls.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A call management system, comprising:
a device for receiving and initiating calls, the device having a control module, the control module in connection with the device being configured to perform the steps of:
allowing a user to initiate or receive a first call from a first caller;
receiving a second call from a second caller while the user is on the first call, the second call being non-related to the first call; and
providing the user with one or more options for managing the second call;
the one or more options including options to allow the user to mute the first call, create a recording, send the recording to the second caller, return to the first call, direct the user's voice to the first call, direct the user's voice to the second call, and speak with the second caller;
wherein the user can communicate with the first caller and the second caller simultaneously through the device and the control module, thereby allowing for the user to manage multiple calls at once without interrupting the first call and the second call.

2. The system of claim 1, wherein the one or more options comprises:
a first option for the user to automatically set a default to notify the second caller to record a caller message;
a second option for the user to press a button associated with the device to prompt the second caller to record the caller message; and
a third option for the user to ignore the second caller.

3. The system of claim 2, wherein the control module and device are further configured to perform the steps of:
notifying the user of the caller message being recorded;
prompting the user to press a second button to play the caller message; and
recording a return message from the user to play back to the second caller while the user is still on the first call;
wherein the first call is muted during the recording of the return message.

4. The system of claim 1, wherein the control module and device are further configured to perform the steps of:
allowing the user to toggle between the first call and the second call.

5. The system of claim 1, wherein the control module and device are further configured to perform the steps of:
switching the user from the first call to the second call.

6. The system of claim 1, further comprising:
a display associated with the device, the display configured to provide a visual representation of data related to the first call and the second call.

7. The system of claim 1, further comprising:
one or more pre-recorded messages saved within the control module and configured to be played to the second caller as determined by the user.

8. A method of managing two or more calls, the method comprising:
initiating or receiving a first call from a first caller on a device configure to receive calls, the device having a control module associated therewith;
receiving a second call from a second caller while active on the first call, the second call being non-related to the first call;
selecting an option from one or more options provided by the control module to manage the second call, the one or more options including options to allow the user to mute the first call, create a recording, send the recording to the second caller, return to the first call, direct the user's voice to the first call, direct the user's voice to the second call, and speak with the second caller; and
communicating with the first caller and the second caller simultaneously through the device and control module, without interrupting the first call and the second call.

9. The method of claim 8, wherein the selecting an option comprises: setting the control module to automatically notify the second collar to record a caller message; notifying the user that the second caller has created a caller message; and playing the caller message to the user.

10. The method of claim 9, further comprising: recording a return message from the user to play back to the second caller while the user is still on the first call.

11. The method of claim 9, further comprising:
pressing a button to prompt the second caller to create a caller message; and
receiving a notification that the second caller has created the caller message; and
pressing a second button to play the caller message through the device.

12. The method of claim 9, further comprising:
toggling between the first call and the second call.

* * * * *